United States Patent [19]
Liu et al.

[11] Patent Number: 6,144,387
[45] Date of Patent: Nov. 7, 2000

[54] GUARD REGION AND HITHER PLANE VERTEX MODIFICATION FOR GRAPHICS RENDERING

[76] Inventors: Mei-Chi Liu, 880 E. Fremont Ave., #518, Sunnyvale, Calif. 94087; Adrian Sfarti, 1235 Wildwood Ave., #350, Sunnyvale, Calif. 94089; Adam Malamy, 961 Pizatto La., Foster City, Calif. 94404; Nicholas Baker, 20697 Sunrise Dr., Cupertino, Calif. 95014; John Cumming, 6013 Macks Rd., Gazelle, Calif. 96034

[21] Appl. No.: 09/055,094

[22] Filed: Apr. 3, 1998

[51] Int. Cl.[7] .................................................. G06T 15/10
[52] U.S. Cl. ........................... 345/427; 345/434; 345/118
[58] Field of Search .................................. 345/118, 434, 345/438, 427

[56] References Cited

U.S. PATENT DOCUMENTS 3,816,726  6/1974  Sutherland et al. ..................... 235/152
4,888,712  12/1989  Barkans et al. ......................... 364/522

*Primary Examiner*—Mark K. Zimmerman
*Assistant Examiner*—Mano Padmanabhan
*Attorney, Agent, or Firm*—Workman, Nydegger and Seeley

[57] ABSTRACT

Performing graphics rendering without the computational expense of hither plane clipping and with only a minimum of display image clipping. Where a three dimensional polygon crosses to both sides of a hither plane, any vertices on the back side of the hither plane are translated to the hither plane, producing polygons which occupy only the area in front of the hither plane. A display image memory, from which display images are generated, is located within a larger guard memory such that many images which would need to be clipped to fit in the display image memory may be written to the guard memory without clipping.

14 Claims, 8 Drawing Sheets

Fig. 1a
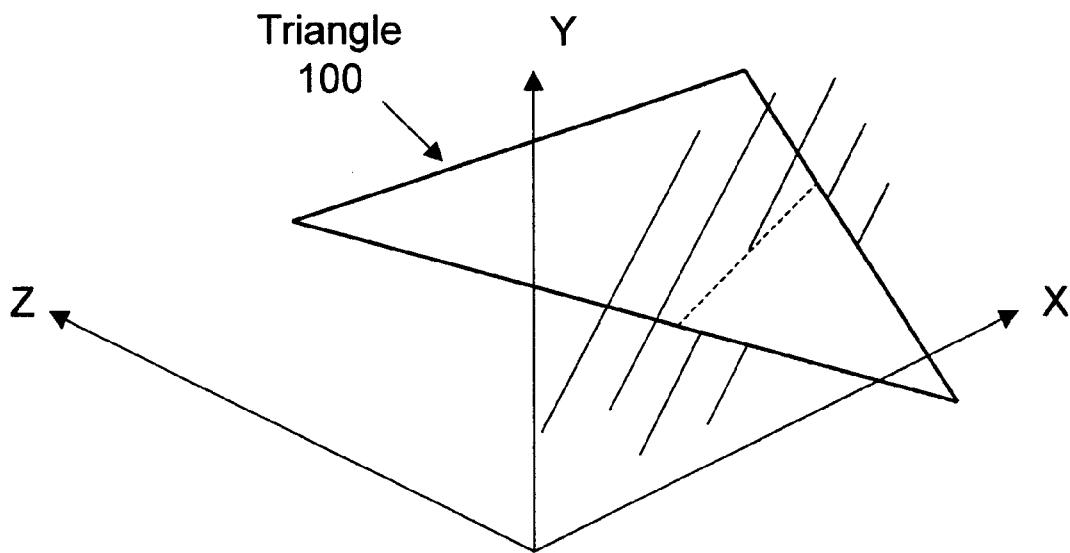
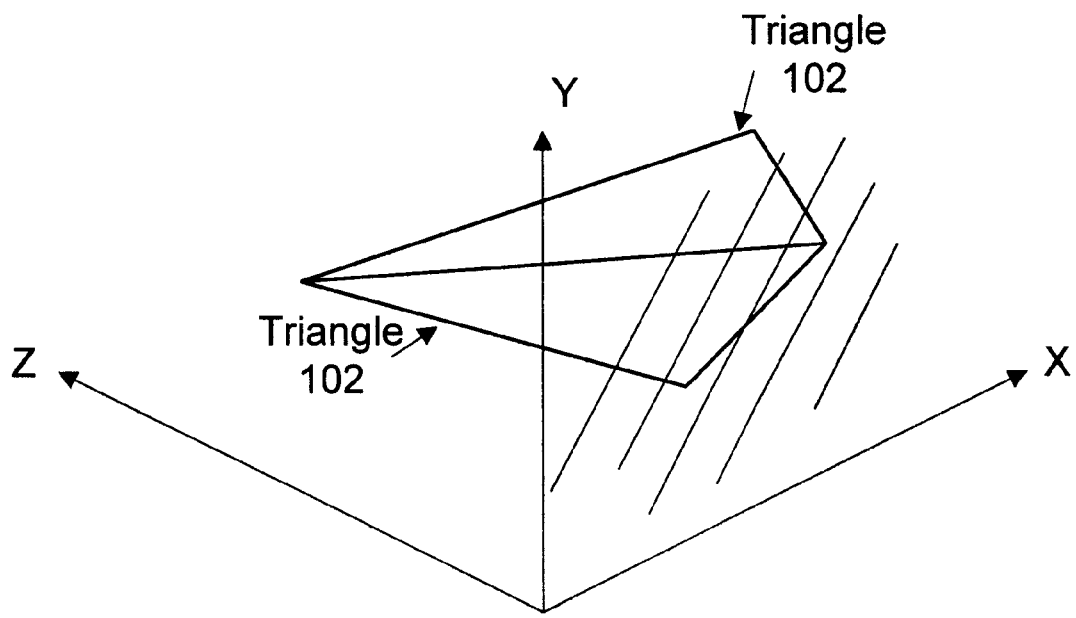
Fig. 1b

Fig. 2a
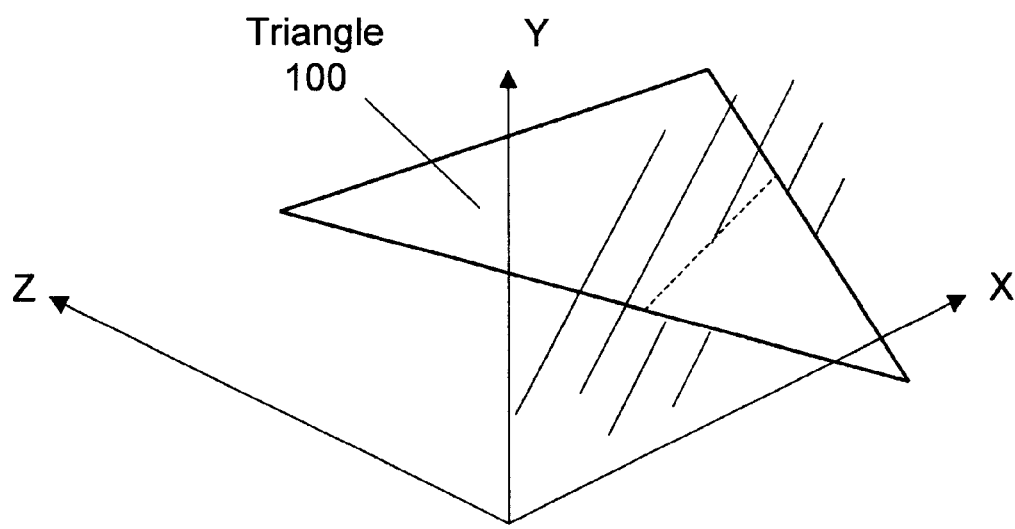
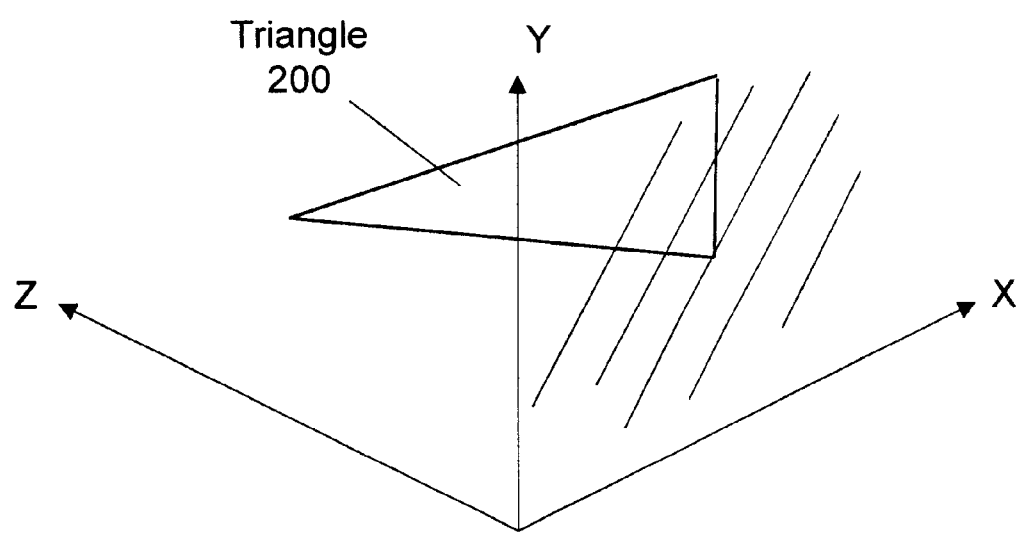
Fig. 2b

Software Hither Plane Vertex Modification

Hardware Hither Plane Vertex Modification

Guard Region Rendering

Rendering System

GUARD REGION AND HITHER PLANE VERTEX MODIFICATION FOR GRAPHICS RENDERING

FIELD OF INVENTION

This invention pertains to the field of computer graphics rendering. More specifically, this invention pertains to using a hither plane and a guard memory region to avoid clipping.

BACKGROUND OF THE INVENTION

Graphics rendering systems create images of objects which are combined in a visual scene. An object is a computer readable specification of appearance attributes which, when used to create a display image, has the appearance of physical substance, and a scene is a collection of objects distributed in an area to be represented in a display image. In a two dimensional graphics rendering system a display image is constructed based on the location and orientation of two dimensional objects in a scene. For a three dimensional graphics rendering system, three dimensional objects are placed in a three dimensional scene with a three dimensional coordinate system, and a camera is defined by at least a location and a direction of view relative to the scene. Rendering is the process of creating a display image based on the objects which would be visible to a camera viewing a scene if it were real, and placing this display image in memory, typically a frame buffer. The display image is composed of an array of picture elements, or pixels, which each exhibit a color. In real-time rendering systems, the display image is displayed, typically on a display screen, while a later display image is being constructed.

High speed rendering systems typically rely on combinations of simple polygons, referred to as primitives, to build models of more complex objects. Such rendering systems are generally optimized to render primitives into frame buffers quickly. Triangles are commonly used as primitives, since objects of arbitrary complexity may be composed of triangles.

Rendering systems commonly use two types of "clipping" when creating display images based on three dimensional scenes. One common clipping method is hither plane clipping. When a rendering system creates a two dimensional representation of a three dimensional scene, it does so by determining the projection of three dimensional primitives within the scene on an image plane. A portion of the image plane corresponds to the display image, and the primitives projected within this portion of the image plane appear in the display image. The projection process usually involves simple geometry which would allow primitives to be projected on the image plane from either side of the image plane. Generally, however, it is desired that only primitives on one side (the "front side") of the image plane be rendered, since primitives on the other side (the "back side") are behind the camera and should be out of the field of view. In order to prevent primitives on the back side of the image plane from being projected on the image plane, hither plane clipping is ordinarily employed. A hither plane is generally parallel to the image plane and marks the boundary between primitives which are drawn and primitives which are not drawn. The hither plane is often located a small distance in front of the image plane, to prevent the attempted projection of points lying within the image plane to the image plane, as the projection geometry generally cannot handle this. The hither plane is between the location of the camera and the drawn objects. Primitives on the back side of the hither plane are not projected on the image plane, and those on the front side are. Primitives which cross the hither plane are subjected to a clipping process, wherein the primitive is modified so as to not extend to the back side of the hither plane. The clipping process can be time consuming, however, and the rendering speed of a system can be adversely affected when even a few primitives cross the hither plane.

The other type of clipping commonly used by rendering systems is image plane clipping. A rendering system typically projects primitives onto an image plane by determining the location of pixels in the image plane which are intersected by lines projected from the primitives to the camera. Because these pixels might not all lie within the area of the image plane which represents the display image, rendering systems often need to determine whether each pixel location of a projection is within the display image area before attempting to render that pixel to the display image. Routines used by the rendering system to determine a display memory address from a pixel coordinate location are usually highly optimized and often will generate erroneous results if given a pixel coordinate location which is outside the bounds of what is expected. If pixels outside the display image area given to a rendering routine which expects only pixels located within the display image area, there may be unexpected results. Testing the location of each pixel prior to drawing it to the display image, however, would slow the rendering process unacceptably.

To overcome this problem many rendering systems use display image clipping. Display image clipping is used to modify image plane projections which lie partially within the display image area of the image plane and partially outside the display image area of the image plane. The projections are modified so that the modified projection lies completely within the display image area of the image plane and has the appearance of that portion of the original projection which was in the display image area. Projections of simple polygons can be quickly tested to determine whether they are within the display image portion of the image plane, outside the display image portion of the image plane, or whether they cross the boundaries of the display image portion of the image plane. Those projections entirely within the display image portion can be rendered, and those entirely outside the display image portion can be ignored. Only those which are partially in and partially out of the display image portion of the image plane need to be clipped. Typical polygon clipping algorithms include those described in Sutherland, I. E., et al., "Reentrant Polygon Clipping," CACM, 17(1), January 1974, 32–42, Weiler, K., "Polygon Comparison Using a Graph Representation," SIGGRAPH 80, 10–18, and Liang, Y-D., and B. A. Barsky, "An Analysis and Algorithm for Polygon Clipping," CACM, 26(11), November 1983, 868–877. The process of clipping the projections, however, is time consuming, and the rendering speed can be significantly degraded if even a few of the primitive projections are subjected to display image clipping.

What is needed is a system which achieves results similar to those achieved through hither plane clipping and display image clipping without taking as much time as these clipping methods.

SUMMARY OF THE INVENTION

A system, method, and computer readable medium are provided for performing graphics rendering with less the computational expense than hither plane clipping and with only a minimum of display image clipping.

In a first embodiment, the invention eliminates the necessity of hither plane clipping. When a primitive is found to have vertices on both sides of a hither plane, any vertices of the primitive on the back side of the hither plane are moved to the hither plane. Because each vertex can be quickly tested and modified, this process is faster than conventional hither plane clipping. This process introduces a distortion into projected images of primitives which cross the hither plane, but in many applications this distortion is acceptable given the increased rendering speed made possible by eliminating conventional hither plane clipping.

In a second embodiment, the necessity for display image clipping is reduced through the use of a guard memory region corresponding to a portion of the image plane which is larger than the display image area of the image plane. The guard memory region corresponds to a set of pixels of the image plane which extends beyond the display image area of the image plane. Pixels can be written to the portions of the guard memory region which are not displayed. Projections which are entirely within the guard memory region are rendered to the guard memory region without clipping. Any projections which are partially outside of the guard memory region are ignored, unless they also overlap with the display image area of the image plane. Only the projections which overlap the display image area of the image plane and also extend beyond the guard memory region are clipped. If the guard memory region is sufficiently large, as compared to the display image area, and the primitives are small enough, the instances of display image clipping can be reduced to an infrequent occurrence. The memory requirements for a system using a guard memory region are higher than conventional systems, but in some cases the faster rendering available from a system such as the second embodiment make it worth the extra memory.

A third embodiment of the present invention is a combination of the first two embodiments. The system modifies primitives which cross the hither plane by moving the back side vertices to the hither plane. The system also uses a guard memory region which is larger than the display image area of the image plane, in order to reduce the number of projections which must be clipped. The use of both techniques allows for fast rendering, since relatively few clipping operations are performed.

BRIEF DESCRIPTION OF THE DRAWINGS

FIGS. 1a and 1b illustrate hither plane clipping.

FIGS. 2a and 2b illustrate the modification of a triangle which crosses the hither plane.

DETAILED DESCRIPTION OF PREFERRED EMBODIMENTS

Hither Plane Vertex Modification

FIGS. 1a and 1b illustrate hither plane clipping. In FIG. 1a, triangle 100 crosses a hither plane defined by the X and Y axes. The hither plane is denoted by crosshatching in FIGS. 1a and 1b. The front side of the hither plane is the side of positive Z. The intersection between the hither plane and triangle 100 is indicated in FIG. 1a by the dashed line. To clip triangle 100 such that it does not extend to the back side of the hither plane, and such that the portion left on the front side is not altered in appearance, requires that triangle 100 be turned into a quadrilateral, as shown in FIG. 1b. For a number of reasons, three dimensional rendering systems generally use only triangles as primitives, so the quadrilateral formed by this clipping operation is constructed of two triangles 102. The clipping procedure determines the points at which new vertices are to be located on the hither plane, and replaces triangle 100 with two new triangles 102, as indicated in FIG. 1b.

FIGS. 2a and 2b illustrate the hither plane vertex modification procedure of one embodiment of the present invention. In FIG. 2a, as in FIG. 1a, Triangle 100 crosses a hither plane defined by the X and Y axes. However, rather than invoking a clipping procedure to compute the quadrilateral which is the portion of triangle 100 on the front side of the hither plane, the vertex on the back side of the hither plane is moved in FIG. 2b so that the Z coordinate value of this vertex is the same as the Z coordinate value of the hither plane. This results in triangle 200 of FIG. 2b. This relatively simple alteration of triangle 100 eliminates the necessity of conventional clipping methods. Unlike conventional hither plane clipping methods, however, the resulting triangle 200 differs from the front portion of triangle 100. The dotted lines in FIG. 2b indicate the shape of the original triangle 100, which has a noticeably different shape than new triangle 200. This distortion is acceptable in many applications, such as those where few primitives are expected to cross the hither plane, and those in which objects move across the hither plane quickly.

Figure 3A:
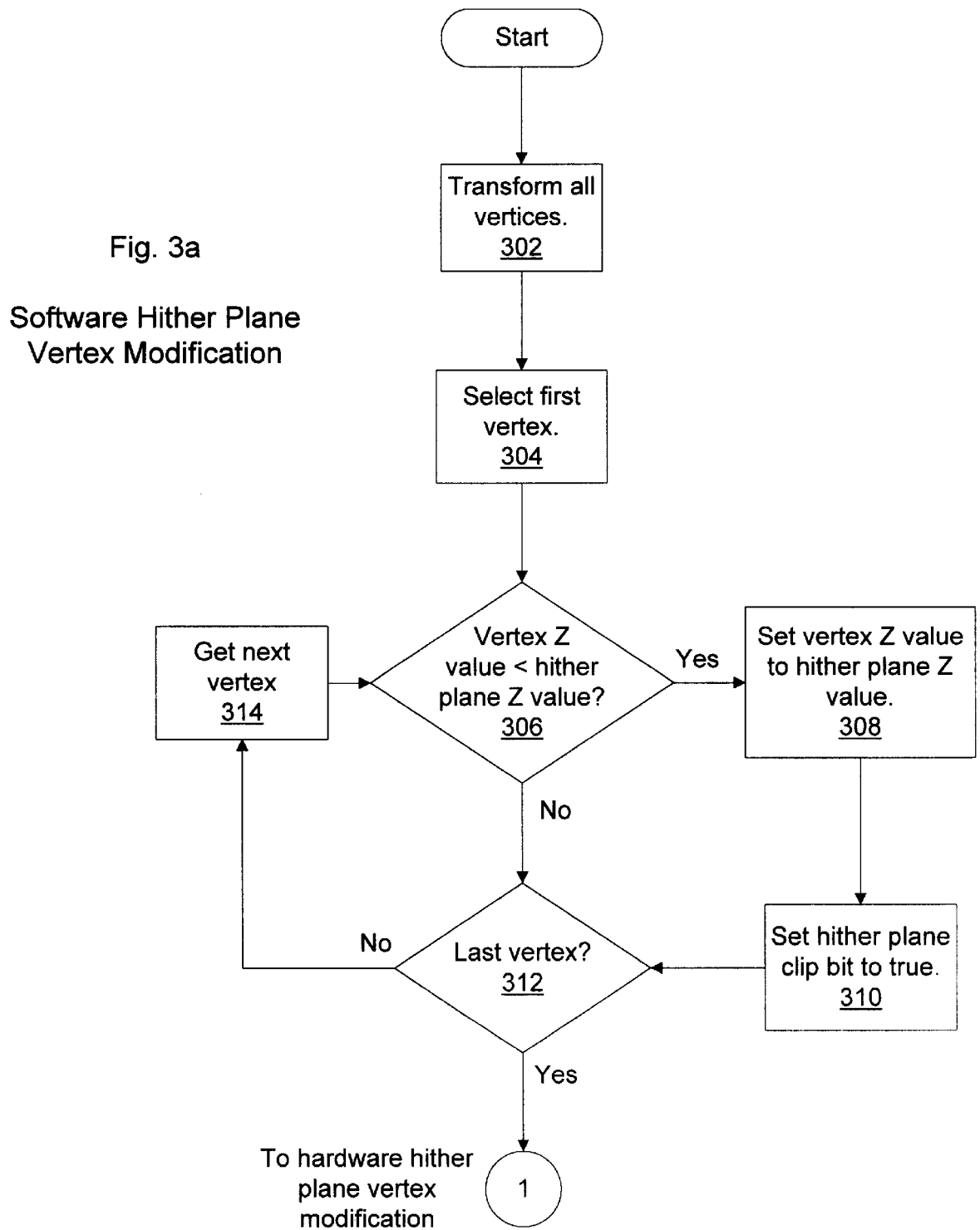
FIGS. 3a and 3b are a flowchart illustrating hither plane vertex modification.
Figure 3B:
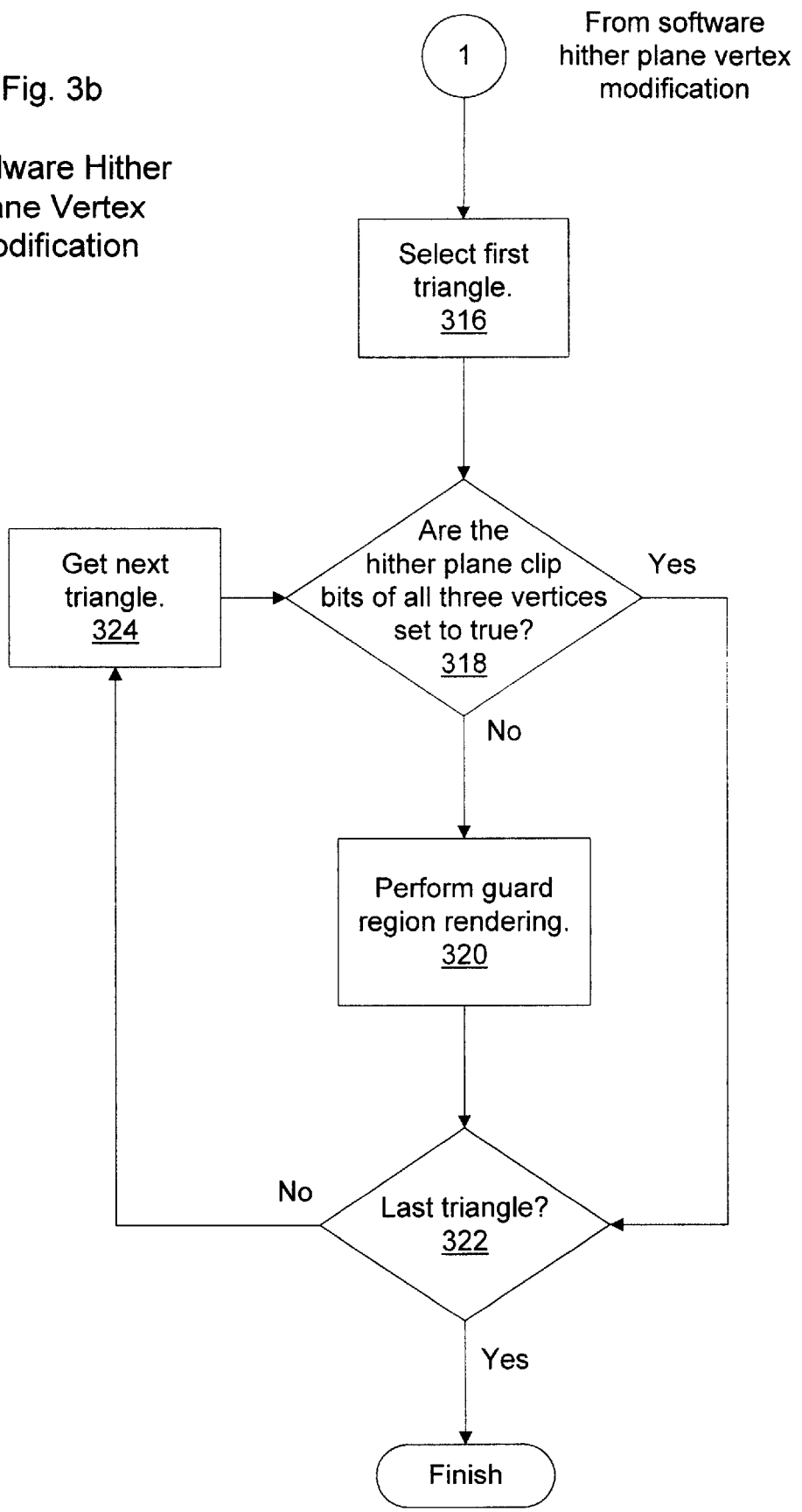

FIGS. 3a and 3b are a flowchart of the process employed by a preferred embodiment of the present invention to achieve this hither plane vertex modification. There is a software portion, illustrated in FIG. 3a, followed by a hardware portion, illustrated in FIG. 3b. First, in the software portion, the scene is constructed and the vertices are transformed 302 to their proper positions with respect to the camera and the hither plane. While the vertices are being transformed 302, a hither plane clip bit associated with each vertex is set to false. Next, the first vertex of the scene is selected 304. The Z coordinate value of this vertex is tested 306 to determine whether it is on the back side of the hither plane, which is perpendicular to the Z axis in this embodiment. If the vertex is on the back side of the hither plane, the Z coordinate value is set 308 to equal the Z value of the hither plane. The hither plane clip bit associated with the vertex is then set 310 to true, to reflect the fact that the vertex had originally been on the back side of the hither plane. Then, whether or not the vertex was found to be on the back side of the hither plane, it is determined 312 whether this vertex is the final vertex of the scene. If it is not, then there are more vertices to be examined, and the next vertex is selected 314. After selecting the next vertex, that vertex is tested 306 as above to determine which side of the hither plane it is on. After all vertices have been examined, triangles 100 have been transformed into triangles 200 which do not extend to the back side of the hither plane. Following the software portion of the hither plane vertex modification routine, the hardware portion is invoked.

Referring now to FIG. 3b, the first triangle 200 is selected 316. The hither plane clip bits of the three vertices of this triangle 200 are examined 318. If any of the hither plane clip bits are not set to true, meaning that at least one vertex was originally on the front side of the hither plane, then this triangle 200 is rendered 320. Otherwise triangle 200 is hidden and is not to be rendered 320. In the preferred embodiment this rendering 320 takes the form of guard region rendering, which is explained below. In other embodiments another rendering method can be invoked.

After the current triangle 200 has either been rendered 320 or determined 318 to be hidden, it is determined whether the current triangle 200 is the last triangle 200 of the scene. If so, the procedure is finished. If not, the next triangle 200 in the scene is selected 324, and the hither plane clip bits of this new triangle 200 are examined 318 as above.

Guard Region Rendering

Figure 4A:
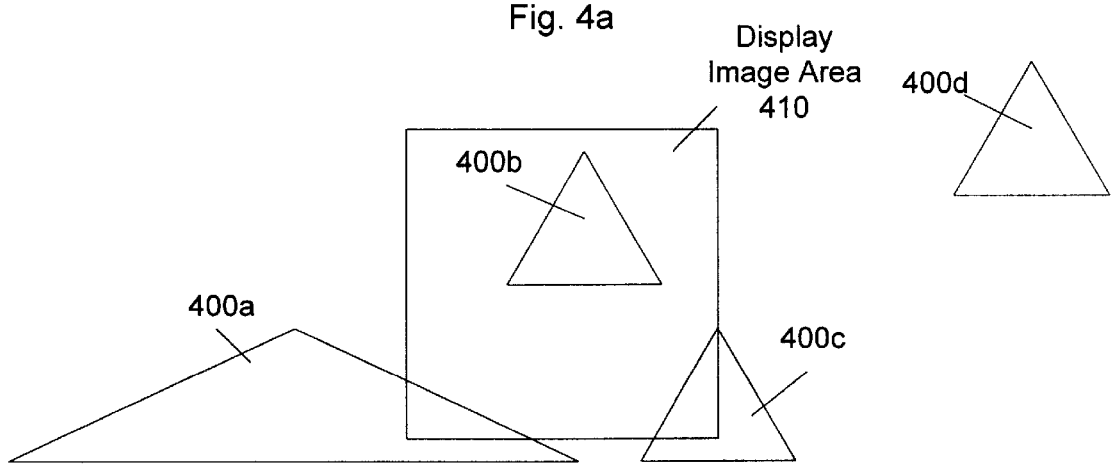
FIGS. 4a and 4b illustrate display image clipping.
Figure 4B:
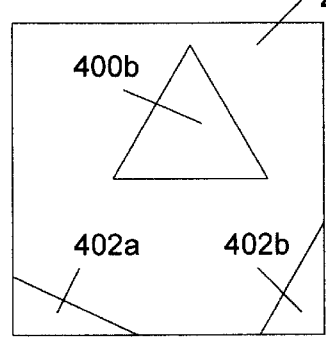

Display image clipping is illustrated in FIGS. 4a and 4b. Shapes 400 are projections of three dimensional triangles 200 on an image plane. Techniques for creating two dimensional polygons as projections of three dimensional polygons on an image plane are known to those skilled in the art. The portion of the image plane designated display image area 410 in FIGS. 4a and 4b that represented by the final display image created by the rendering process. Some of projections 400 are within display image area 410, some are outside display image area 410, and some are partially within display image area 410. FIG. 4b illustrates the results of a display image clipping process. Projection 400d, which is completely outside display image area 410, has been eliminated. Projections 400a and 400c have been replaced by triangles 402a and 402b, which are completely within visible screen area 410. Clipping methods for determining polygons 402 which coincide with the visible portions of projections 400 are known to those skilled in the art.

Figure 5A:
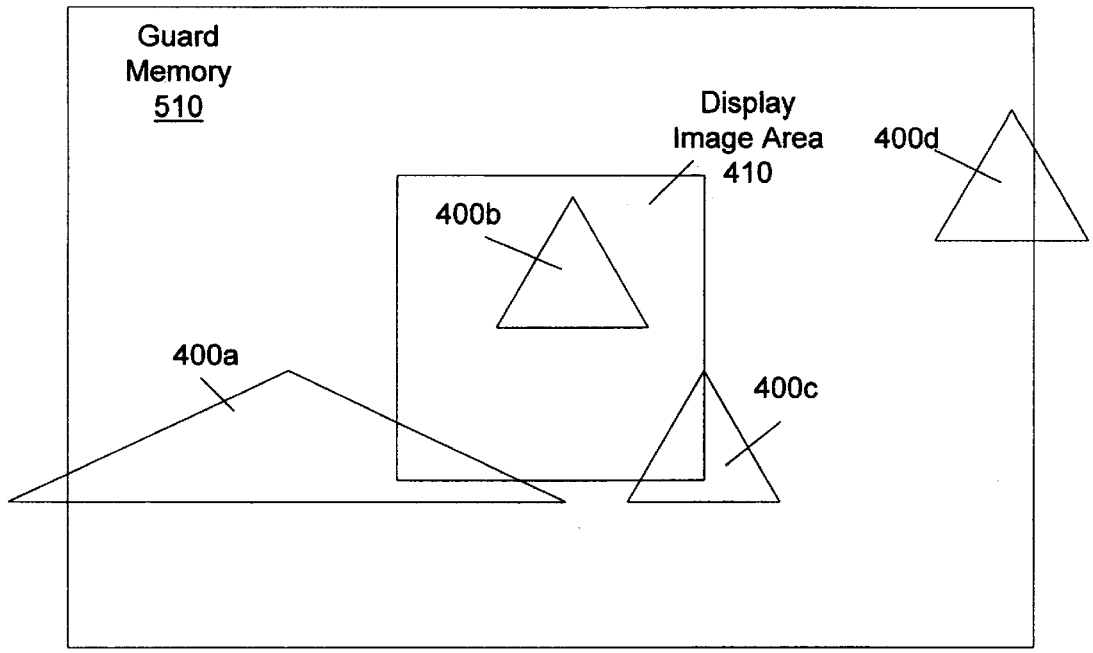
FIGS. 5a and 5b illustrate the use of a larger memory containing the display image area.
Figure 5B:
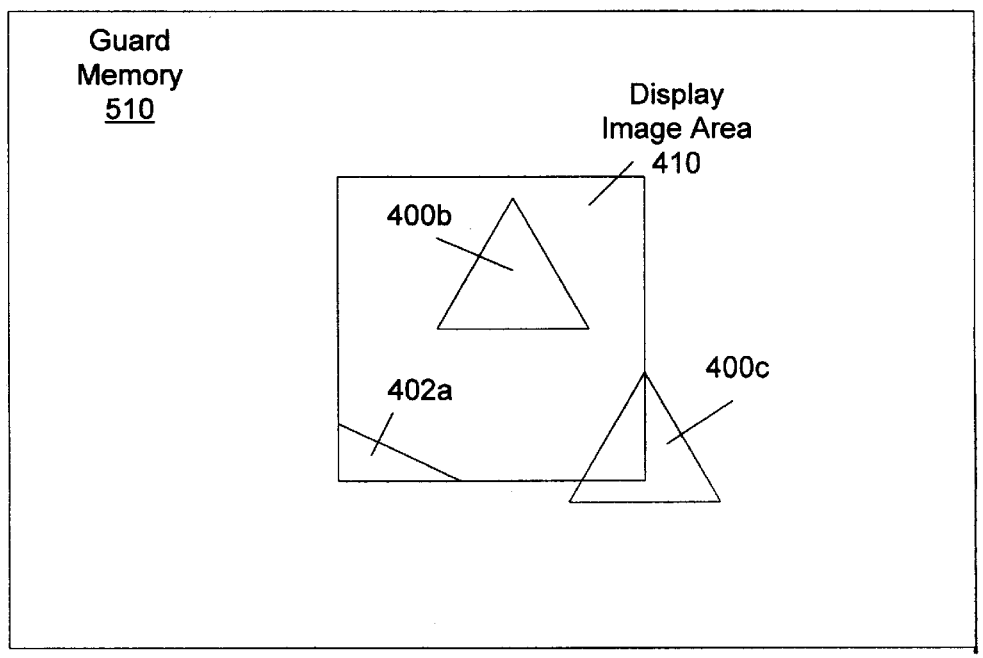

As illustrated in FIGS. 5a and 5b, in a preferred embodiment of the present invention, guard memory 510 is provided which is representative of a pixel array which subsumes display image area 410. Although the rendering system can set pixel values throughout the entire guard memory 510, only those within display image area 410 are utilized by the display hardware for the final display image. Computer display devices for displaying as an image only a portion of a larger display memory are well known to those skilled in the art. The addressable portion of guard memory 510 is much larger than the portion 410 used to generate display images.

A projection 400 which is partially within display image area 410, but wholly within guard memory 510, such as triangle 400c, requires no clipping. Instead, it is drawn to guard memory 510, and only that portion within region 410 appears in the display image. A projection such as projection 400d which is only partially within guard memory 510, but entirely outside display image area 410, can be discarded and not drawn at all. The only case which requires image plane clipping is a projection, like projection 400a, which is partially within display image area 410, but also exceeds the limits of guard memory 510. In such a case the projection is clipped according to a conventional method, resulting in a new projection, such as triangle 402a. If projections 400 are relatively small, and guard memory 510 is relatively large compared to display image area 410, the occurrence of situations which require image plane clipping is rare.

Figure 6:
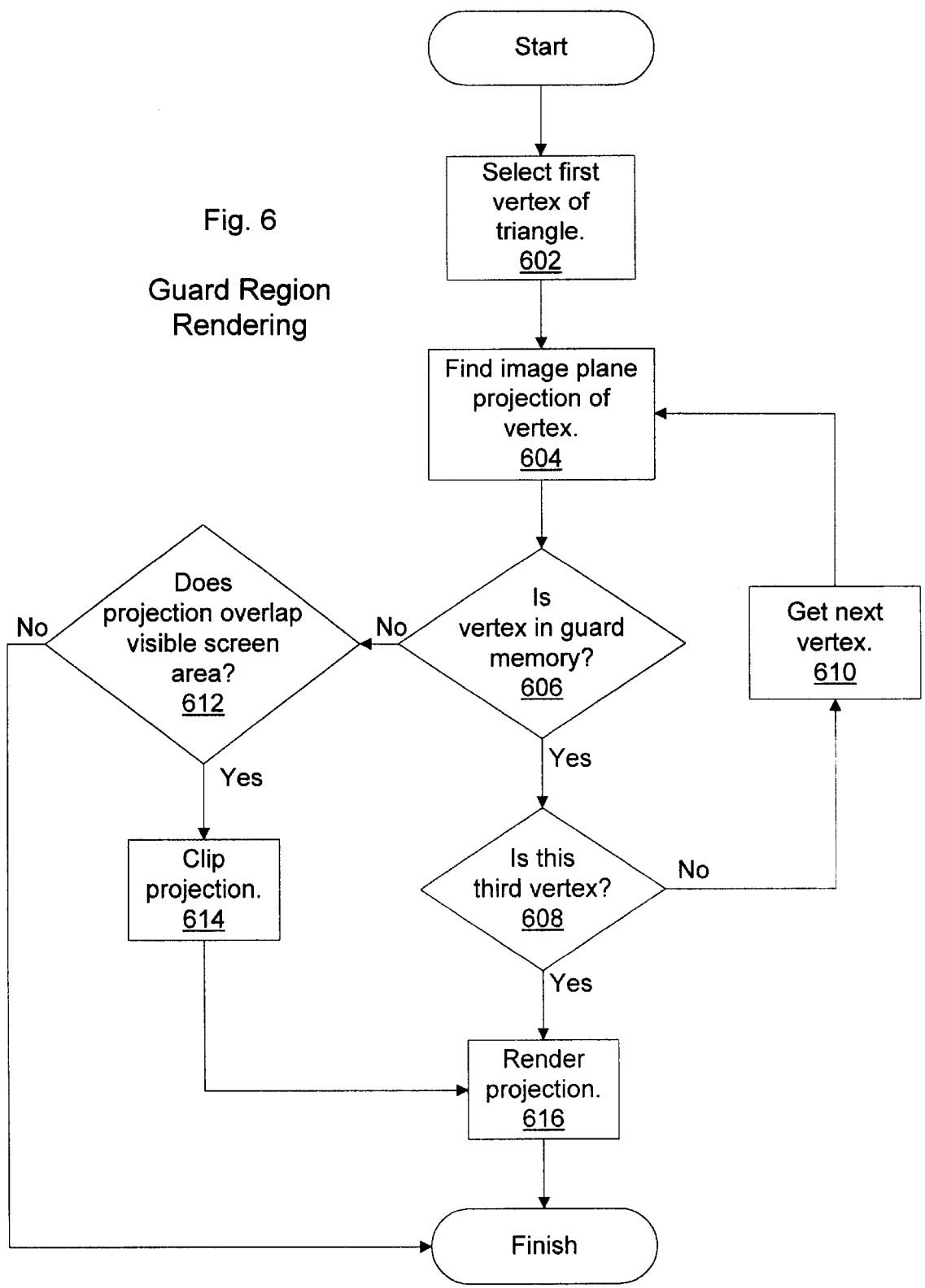
FIG. 6 is a flowchart illustrating guard region rendering.

FIG. 6 illustrates the operation of the guard region rendering method used in a preferred embodiment. The procedure begins when triangle 200 is passed 322 from the hither plane vertex modification procedure to the guard region rendering procedure. The first vertex of triangle 200 is selected 602, and the image plane projection of this vertex is determined 604. The location of the image plane projection of the vertex is tested 606 to determine whether it corresponds to a location within guard memory 510. If it would lie within guard memory 510, it is determined 608 whether the vertex is the third of triangle 200. If not, the next vertex of triangle 200 is selected 610, and the process continues as above with the image plane projection of the new vertex being determined 604. If the vertex is the third vertex of triangle 200, then all projected vertices of triangle 200 correspond to locations within guard memory 510, and the projection of triangle 200 is rendered 616 to guard memory 510.

If a vertex is found 606 for which the projection would not be located in guard memory 510, the projection of triangle 200 on the image plane is tested 612 to determine whether it would overlap display image area 410. If it would, then the projection must be clipped 614 before being rendered 616 to guard memory 510. If the projection of triangle 200 would not overlap display image area 410, then triangle 200 may be ignored and the procedure is finished.

Figure 7:
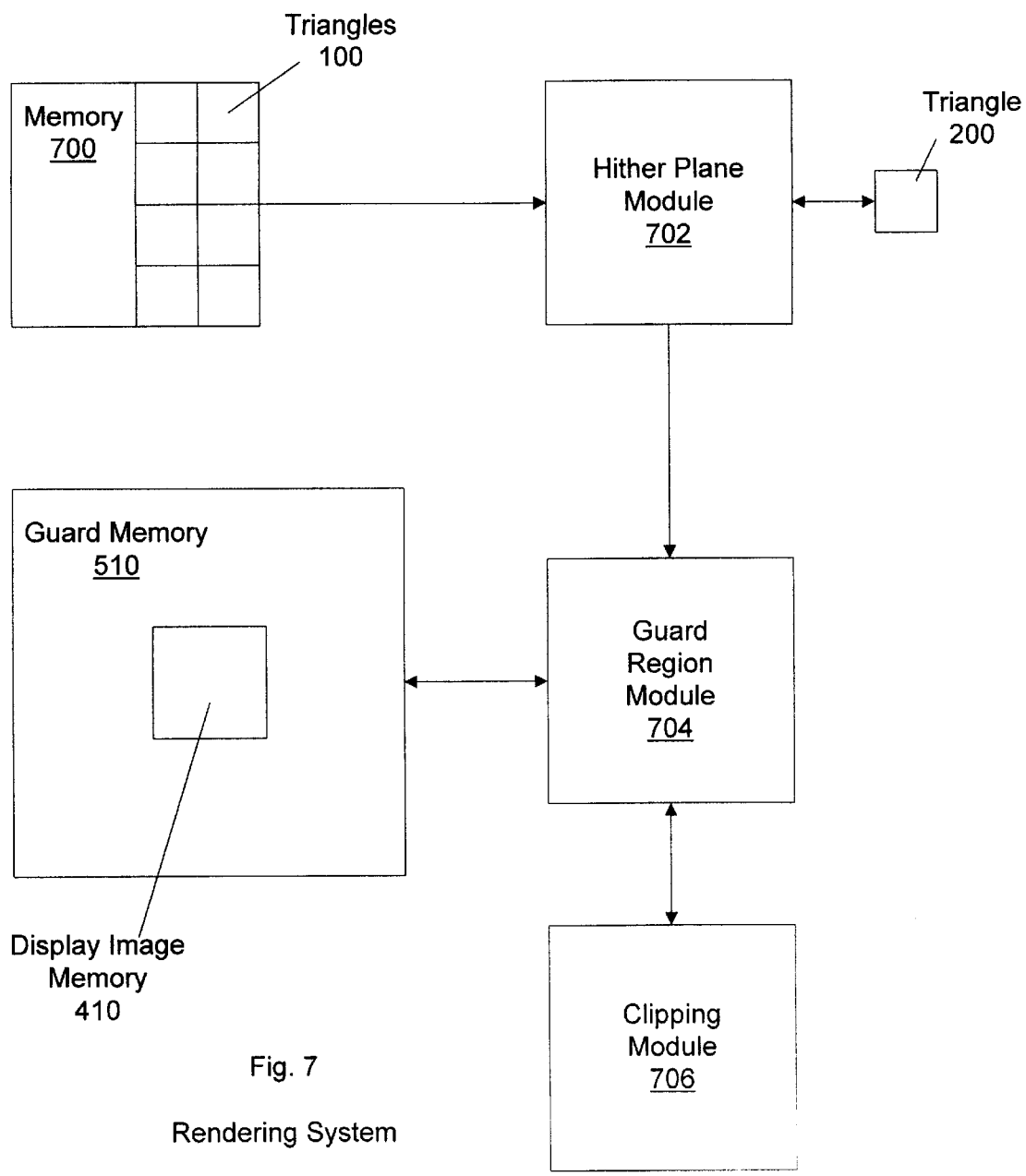
FIG. 7 is an illustration of one embodiment of the present invention.

Referring now to FIG. 7, a rendering system in accordance with a preferred embodiment of the present invention is illustrated. A scene to be rendered is composed of triangles 100, stored in memory 700. Each triangle 100 is transferred, one at a time, from memory 700 to hither plane module 702. Hither plane module 702 converts each triangle 100 into triangle 200, where triangle 200 does not extend to the back side of the hither plane. If at least some portion of triangle 200 extends to the front side of the hither plane, triangle 200 is transmitted by hither plane module 702 to guard region module 704.

Guard region module 704 creates a projection of triangle 200 to the image plane, and determines whether the projection, if rendered to guard memory 510 would extend beyond the boundaries of guard memory 510. If not, guard region module 704 renders the projection to guard memory 510. Otherwise, guard region module 704 determines whether the projection, if rendered to guard memory 510 would overlap display image memory 410. If it would not, then the projection is discarded and the process can begin again. If it would overlap display image memory 410, guard region module 704 sends the projection to clipping module 706. Clipping module 706 then creates a clipped projection which does not exceed the boundaries of guard memory 510. This clipped projection is returned to guard region module 704, which then renders it to guard memory 510.

The modules which make up the parts of the embodiment of FIG. 7 can be implemented in hardware, firmware, software or any combination thereof. For example, the modules could be implemented as integrated circuits mounted on a three dimensional model rendering board installed in a PENTIUM computer system which is connected to a SVGA-capable computer monitor.

The above description is included to illustrate the operation of an exemplary embodiment and is not meant to limit the scope of the invention. The scope of the invention is to be limited only by the following claims. From the above description, many variations will be apparent to one skilled in the art that would be encompassed by the spirit and scope of the present invention.

What is claimed is:

1. In a three-dimensional rendering system, a method of rendering a polygon with reference to a hither plane that eliminates dipping when the polygon crosses through the hither plane, which hither plane separates a side of a scene that is to be rendered from a side of the scene that is not to be rendered, the method comprising the steps of:

for each vertex of the polygon,
determining whether the vertex is on the side of the hither plane that is not to be rendered; and
responsive to a determination that the vertex is on the side of the hither plane that is not to be rendered, changing the location of the vertex to a location on the side of the hither plane that is to be rendered, the location being independent of all other vertices of the polygon.

2. The method of claim 1 wherein:
the three dimensional rendering system creates images based on projections of polygons to an image plane; and
the hither plane is parallel to the image plane.

3. A method of using a hither plane to render a three dimensional polygon to screen memory that eliminates hither plane clipping when the polygon crosses through the hither plane, which polygon is indicated within a three dimensional scene, which screen memory is a subset of a larger total memory, which total memory corresponds to a portion of an image plane, and which hither plane separates a side of the scene that is to be rendered from a side of the scene that is not to be rendered, the method comprising the steps of:

for each vertex of the polygon:
determining whether the vertex is on the side of the hither plane that is not to be rendered; and
responsive to a determination that the vertex is on the side of the hither plane that is not to be rendered, changing the location of the vertex to a location on the side of the hither plane that is to be rendered, the location being of all other vertices of the polygon;

determining a two dimensional projection of the polygon to the image plane;

responsive to the projection being entirely within the portion of the image plane which corresponds to the total memory, rendering the projection to the total memory; and responsive to the projection being partially within the portion of the image plane which corresponds to the screen memory and being partially outside the portion of the image plane which corresponds to the total memory;
clipping the projection to produce a clipped projection which lies entirely within the portion of the image plane which corresponds to the total memory; and
rendering the clipped projection to the total memory.

4. The method of claim 3 wherein:
each vertex of the polygon is specified by a plurality of coordinates, including a Z coordinate which corresponds to a location along an axis which is perpendicular to the hither plane; and
the step of changing the location of the vertex comprises changing the Z coordinate of the vertex to the Z value which corresponds to the hither plane.

5. The method of claim 3 wherein the hither plane is parallel to the image plane.

6. The method of claim 5 wherein:
each vertex of the polygon is specified by a plurality of coordinates, including a Z coordinate which corresponds to a location along an axis which is perpendicular to the hither plane; and
the step of changing the location of the vertex comprises changing the Z coordinate of the vertex to the Z value which corresponds to the hither plane.

7. The method of claim 5 wherein:
each vertex of the polygon is specified by a plurality of coordinates, including a Z coordinate which corresponds to a location along an axis which is perpendicular to the hither plane; and
the step of changing the location of the vertex comprises changing the Z coordinate of the vertex to a Z value which is on the side of the hither plane which corresponds to the part of the scene which is to be rendered.

8. The method of claim 3, wherein clipping the projection comprises producing a clipped projection which lies entirely within the portion of the image plane which corresponds to the screen memory.

9. A computer program product for implementing a method of using a hither plane to render a three dimensional polygon to screen memory that eliminates hither plane clipping when the polygon crosses through the hither plane, which polygon is indicated within a three dimensional scene, which screen memory is a subset of a larger total memory, which total memory corresponds to a portion of an image plane, and which hither plane separates a side of the scene that is to be rendered from a side of the scene that is not to be rendered, the computer program product comprising a computer-readable medium containing program code means for implementing a method comprising the steps of:

for each vertex of the polygon:
determining whether the vertex is on the side of the hither plane that is not to be rendered; and
responsive to a determination that the vertex is on the side of the hither plane that is not to be rendered, changing the location of the vertex to a location on the side of the hither plane that is to be rendered, the location being independent of all other vertices of the polygon;

determining a two dimensional projection of the polygon to the image plane;

responsive to the projection being entirely within the portion of the image plane which corresponds to the total memory, rendering the projection to the total memory; and responsive to the projection being partially within the portion of the image plane which corresponds to the screen memory and being partially outside the portion of the image plane which corresponds to the total memory:
clipping the projection to produce a clipped projection which lies entirely within the portion of the image plane which corresponds to the total memory, and
rendering the clipped projection to the total memory.

10. The computer program of claim 9 wherein:
each vertex of the polygon is specified by a plurality of coordinates, including a Z coordinate which corresponds to a location along an axis which is perpendicular to the hither plane; and
the step of changing the location of the vertex comprises changing the Z coordinate of the vertex to the Z value which corresponds to the hither plane.

11. The computer program product of claim 9 wherein the hither plane is parallel to the image plane.

12. The computer program product of claim 11 wherein:
each vertex of the polygon is specified by a plurality of coordinates, including a Z coordinate which corresponds to a location along an axis which is perpendicular to the hither plane; and
the step of changing the location of the vertex comprises changing the Z coordinate of the vertex to the Z value which corresponds to the hither plane.

13. The computer program product of claim 11 wherein:
each vertex of the polygon is specified by a plurality of coordinates, including a Z coordinate which corresponds to a location along an axis which is perpendicular to the hither plane; and
the step of changing the location of the vertex comprises changing the Z coordinate of the vertex to a Z value which is on the side of the hither plane which corresponds to the part of the scene which is to be rendered.

14. The Computer program product of claim 9 wherein clipping the projection comprises producing a clipped projection which lies entirely within the portion of the image plane which corresponds to the screen memory.

* * * * *

UNITED STATES PATENT AND TRADEMARK OFFICE
CERTIFICATE OF CORRECTION

PATENT NO. : 6,144,387
DATED : November 7, 2000
INVENTOR(S) : Mei-Chi Liu; Adrian Sfarti; Adam Malamy Nicholas Baker; John Cumming It is certified that error appears in the above-identified patent and that said Letters Patent is hereby corrected as shown below:

<u>Column 2,</u>
Line 63, after "less" insert -- than --

<u>Column 6,</u>
Line 44, after "eliminates" change "dipping" to -- clipping --

<u>Column 7,</u>
Line 11, after "being" insert -- independent --

<u>Column 8,</u>
Line 31, after "program" insert -- product --
Line 58, after "The" change "Computer" to -- computer --

Signed and Sealed this

Nineteenth Day of March, 2002

Attest:

JAMES E. ROGAN
*Attesting Officer*     *Director of the United States Patent and Trademark Office*